US012742710B2

(12) United States Patent
Mulloth

(10) Patent No.: US 12,742,710 B2
(45) Date of Patent: Sep. 22, 2026

(54) SYSTEM AND METHOD FOR SCANNING A COMPONENT

(71) Applicant: ROLLS-ROYCE plc, London (GB)

(72) Inventor: Akhil Mulloth, Derby (GB)

(73) Assignee: ROLLS-ROYCE plc, London (GB)

( * ) Notice: Subject to any disclaimer, the term of this patent is extended or adjusted under 35 U.S.C. 154(b) by 225 days.

(21) Appl. No.: 18/647,507

(22) Filed: Apr. 26, 2024

(65) Prior Publication Data

US 2024/0361218 A1 Oct. 31, 2024

(30) Foreign Application Priority Data

Apr. 27, 2023 (GB) ..................................... 2306184

(51) Int. Cl.
*G01N 23/00* (2006.01)
*G01N 1/42* (2006.01)
*G01N 23/046* (2018.01)

(52) U.S. Cl.
CPC ............. *G01N 1/42* (2013.01); *G01N 23/046* (2013.01); *G01N 2223/3103* (2013.01); *G01N 2223/63* (2013.01)

(58) Field of Classification Search
CPC . G01N 1/42; G01N 2223/3103; G01N 23/046
See application file for complete search history.

(56) References Cited

U.S. PATENT DOCUMENTS 5,465,283 A 11/1995 Tam
5,960,055 A 9/1999 Samarasekera et al.

FOREIGN PATENT DOCUMENTS

CN 108844980 A 11/2018
CN 115078139 A 9/2022
CN 112255111 B * 4/2023

OTHER PUBLICATIONS

English Translation CN 112255111B (Year: 2023).*
Oct. 3, 2023 Combined Search and Examination Report issued in British Patent Application No. 2306184.9.

* cited by examiner

*Primary Examiner* — Dani Fox
(74) *Attorney, Agent, or Firm* — Oliff PLC

(57) ABSTRACT

A method for scanning at least one component includes placing the at least one component inside a storage vessel; filling the storage vessel with a cryogenic material; cooling the at least one component; placing the storage vessel between an x-ray source and a detector of a CT scanner; generating, via the x-ray source, an x-ray cone beam after cooling of the component that passes through the storage vessel while the at least one component is disposed within the storage vessel; receiving the x-ray cone beam at the detector; and generating an x-ray image of the at least one component.

20 Claims, 10 Drawing Sheets

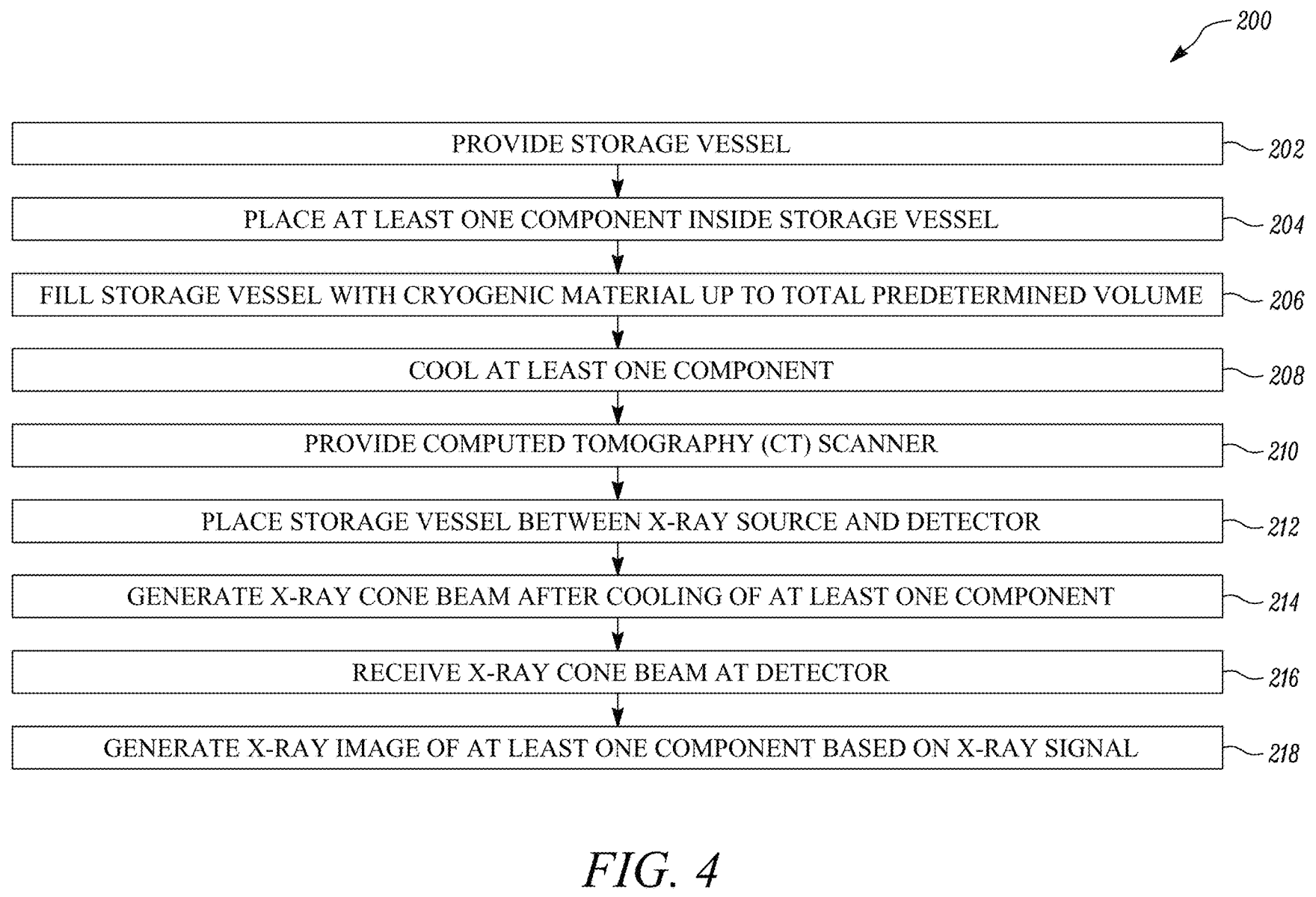

200

202 PROVIDE STORAGE VESSEL

204 PLACE AT LEAST ONE COMPONENT INSIDE STORAGE VESSEL

206 FILL STORAGE VESSEL WITH CRYOGENIC MATERIAL UP TO TOTAL PREDETERMINED VOLUME

208 COOL AT LEAST ONE COMPONENT

210 PROVIDE COMPUTED TOMOGRAPHY (CT) SCANNER

212 PLACE STORAGE VESSEL BETWEEN X-RAY SOURCE AND DETECTOR

214 GENERATE X-RAY CONE BEAM AFTER COOLING OF AT LEAST ONE COMPONENT

216 RECEIVE X-RAY CONE BEAM AT DETECTOR

218 GENERATE X-RAY IMAGE OF AT LEAST ONE COMPONENT BASED ON X-RAY SIGNAL

FIG. 4

SYSTEM AND METHOD FOR SCANNING A COMPONENT

CROSS-REFERENCE TO RELATED APPLICATIONS

This specification is based upon and claims the benefit of priority from United Kingdom patent application number GB 2306184.9 filed on Apr. 27, 2023, the entire contents of which is incorporated herein by reference.

BACKGROUND

1. Field of the Disclosure

The present disclosure generally relates to a system and a method for scanning a component.

2. Description of the Related Art

Computed tomography ("CT") is a widely available technology, and it has been proposed previously to use CT techniques for investigative work on subjects such as aerofoil blades, and in particular, turbine blades of gas turbine engines. Generally, during a CT scan, x-ray beams that are generated by an x-ray source penetrate the subject to be scanned. The x-ray beam, after being attenuated by different densities of material within the subject, impinges upon an array of radiation detectors. The array of radiation detectors produces electrical signals indicative of the attenuated x-ray beam, thereby generating an x-ray image.

Most turbine blades are manufactured using extremely high-density materials, such as high-density nickel superalloys. The extremely high density of turbine blade materials means that the material absorbs too much x-ray energy during the CT scan process. This may inhibit generation of sufficiently clear images of aerofoil sections of the turbine blade for meaningful analysis.

SUMMARY

According to a first aspect, there is provided a method for scanning at least one component. The method includes providing a storage vessel. The storage vessel is configured to store a cryogenic material and the at least one component. The method further includes placing the at least one component inside the storage vessel. The method further includes filling the storage vessel with the cryogenic material up to a total predetermined volume, such that the at least one component is at least partially submerged in the cryogenic material. The method further includes cooling, via the cryogenic material, the at least one component. The method further includes providing a computed tomography (CT) scanner. The CT scanner includes an x-ray source and a detector. The method further includes placing the storage vessel between the x-ray source and the detector. The method further includes generating, via the x-ray source, an x-ray cone beam after cooling of the at least one component. The x-ray cone beam passes through the storage vessel while the at least one component is disposed within the storage vessel. The method further includes receiving the x-ray cone beam at the detector. The detector is configured to generate an x-ray signal in response to receiving the x-ray cone beam. The method further includes generating an x-ray image of the at least one component based on the x-ray signal.

The method of the present disclosure includes placing the at least one component inside the storage vessel and filling the storage vessel with the cryogenic material, such that the at least one component is at least partially submerged in the cryogenic material. The cryogenic material may cool the at least one component. Reducing a temperature of the at least one component may significantly reduce x-ray attenuation by absorption during scanning of the at least one component using the CT scanner. Thus, the proposed method may improve a scan quality of the at least one component even though the at least one component may be thick and include high density materials.

The storage vessel may have walls with low x-ray attenuation to enable the x-ray cone beam to enter the storage vessel and pass through the at least one component. Further, the cryogenic material may also have low x-ray attenuation to allow the x-ray cone beam to pass through the at least one component.

In some embodiments, the cryogenic material may be in a liquid state. In some other embodiments, the cryogenic material may be in a solid state. In such cases, the cryogenic material may be in the form of small particles, powder, grains, or aggregates. For example, the cryogenic material may be cooled to cryogenic temperatures and crushed before filling into the storage vessel. This may be referred to as indirect cooling. The crushed cryogenic material may completely surround the at least one component and may completely fill any voids or gaps within the storage vessel, thereby providing an approximately constant material thickness for the x-ray cone beam to pass through and improving the scan quality of the at least one component. The cryogenic material (e.g., a powder or granular material) may also support the at least one component within the storage vessel in any orientation.

In some embodiments, the cryogenic material may have substantially the same x-ray beam attenuation as that of the at least one component. A constant attenuation coefficient throughout a volume of the storage vessel may improve the scan quality of the at least one component at varying angles about an axis of rotation.

In some embodiments, the at least one component may include a plurality of components. The proposed method may also allow the plurality of components to be scanned through the CT scanner.

In some embodiments, a complimentary structure is disposed within the storage vessel adjacent to the at least one component. The complimentary structure may be disposed in a fixed relationship with the at least one component. A volume of the complimentary structure may be solid or filled with a filling material. The complimentary structure may be configured to reduce a variation in imaging beam attenuation across the complementary structure and the at least one component at multiple relative angles of rotation. Thus, the complimentary structure may improve the scan quality of the at least one component, especially where the at least one component includes complex cross sections and/or cross-sections that change along their length.

In some embodiments, the method further includes removing the cryogenic material from the storage vessel prior to generating the x-ray cone beam. This may allow a pressure within the storage vessel to be reduced in the absence of the cryogenic material. Thus, the storage vessel with relatively thin walls may be used in such cases for scanning the at least one component. The cryogenic material may be removed from the storage vessel after cooling of the at least one component. In some embodiments, the at least one component may be supported within the storage vessel by a support structure. After removing the cryogenic material from the storage vessel, the support structure may provide a thermal mass regulating the temperature of the at least one component.

In some embodiments, the x-ray cone beam passes through the storage vessel while the at least one component is being surrounded by the cryogenic material within the storage vessel. The cryogenic material may help maintain the low temperature of the at least one component during scanning of the at least one component.

In some embodiments, the method further includes removing the storage vessel from the CT scanner. The method further includes removing the cryogenic material from the storage vessel. The method further includes removing the at least one component from the storage vessel after the at least one component attains a room temperature. The temperature of the at least one component may increase to the room temperature before the at least one component is removed from the storage vessel, thereby reducing any risk to nearby systems and personnel.

In some embodiments, filling the storage vessel includes progressively increasing a volume of the cryogenic material inside the storage vessel in a plurality of stages separated from each other by corresponding predetermined time durations. Progressively increasing the volume of the cryogenic material inside the storage vessel in the plurality of stages may reduce a risk of thermal shock to the at least one component and the storage vessel by eliminating sudden reduction in their temperature in the presence of the cryogenic material.

In some embodiments, filling the storage vessel includes the steps of filling the storage vessel with the cryogenic material up to a first predetermined threshold volume. Filling the storage vessel further includes keeping the storage vessel for a first predetermined period of time with the first predetermined threshold volume of the cryogenic material. Filling the storage vessel further includes filling the storage vessel with the cryogenic material up to a second predetermined threshold volume. Filling the storage vessel further includes keeping the storage vessel for a second predetermined period of time with the second predetermined threshold volume of the cryogenic material. Filling the storage vessel further includes filling the storage vessel with the cryogenic material up to the total predetermined volume. These steps may reduce the risk of thermal shock to the at least one component and the storage vessel by eliminating sudden reduction in their temperature in the presence of the cryogenic material.

In some embodiments, filling the storage vessel further includes regulating a flow of the cryogenic material into the storage vessel. The flow of the cryogenic material into the storage vessel may be regulated to allow a controlled decrease in the temperature of the storage vessel and the at least one component. The flow of the cryogenic material may be regulated based on an acceptable rate of decrease in the temperature of the storage vessel and the at least one component. A valve may be used for regulating the flow of the cryogenic material.

In some embodiments, cooling the at least one component includes keeping the storage vessel until a temperature of the at least one component is equal to a temperature of the cryogenic material prior to generating the x-ray cone beam. This may allow the at least one component to attain a thermal equilibrium with the cryogenic material.

In some embodiments, the method further includes rotating the storage vessel about an axis of rotation after generating the x-ray image. The method further includes generating, via the x-ray source, at least one additional x-ray cone beam passing through the storage vessel while the at least one component is disposed within the storage vessel. The method further includes receiving the at least one additional x-ray cone beam at the detector. The detector is configured to generate at least one additional x-ray signal in response to receiving the at least one additional x-ray cone beam. The method further includes generating at least one additional x-ray image of the at least one component based on the at least one additional x-ray signal. Rotating the storage vessel about the axis of rotation may allow the at least one additional x-ray image to be taken at different positions about the axis of rotation. Thus, multiple x-ray images of the at least one component may be taken at different orientations about the axis of rotation.

In some embodiments, the at least one component may be disposed within the storage vessel offset from the axis of rotation. This may improve the scan quality of the at least one component in cases where the at least one component is non-axisymmetric. Improvement in the scan quality may be attributed to reduced beam artifacts and higher contrast.

In some embodiments, the method further includes generating a 3D scan image of the at least one component based on the x-ray image and the at least one additional x-ray image. The x-ray image and the at least one additional x-ray image may be stacked-up using data processing algorithms to generate a 3D volumetric image of the at least one component.

In some embodiments, the cryogenic material is liquid nitrogen. Liquid nitrogen is among the least expensive of commercially available cryogenic materials, and also among the most user friendly. Liquid nitrogen may therefore be handled and employed with minimal risk of damage to equipment and injury to personnel.

In some embodiments, the at least one component is a turbine blade of a gas turbine engine. Thus, the proposed method may enable scanning of the turbine blade that is usually made of high-density materials.

In some embodiments, the method further includes receiving the storage vessel within an outer vessel. The outer vessel may provide additional protection in case of leakage of the cryogenic material from the storage vessel.

According to a second aspect, there is provided a system for scanning at least one component. The system includes a computed tomography (CT) scanner including an x-ray source configured to generate an x-ray cone beam. The CT scanner further includes a detector configured to receive the x-ray cone beam and generate an x-ray signal in response to the reception of the x-ray cone beam. The system further includes a storage vessel disposed between the x-ray source and the detector. The storage vessel receives a cryogenic material therein. The at least one component is at least partially submerged within the cryogenic material, such that the at least one component is cooled by the cryogenic material. The x-ray source generates the x-ray cone beam after the at least one component is cooled by the cryogenic material. The x-ray cone beam passes through the storage vessel while the at least one component is disposed within the storage vessel.

The cryogenic material may significantly reduce the temperature of the at least one component, thereby reducing x-ray attenuation by absorption during scanning of the at least one component using the CT scanner. Thus, the proposed system may improve the scan quality of the at least one component even though the at least one component may be thick and include high density materials.

In some embodiments, the cryogenic material is liquid nitrogen.

In some embodiments, the storage vessel further includes a vent for vapors of the cryogenic material. Thus, vapors of the cryogenic material may be allowed to escape through the storage vessel, thereby preventing any negative effect on the scanning of the at least one component.

In some embodiments, the system further includes a reservoir for storing the cryogenic material. The reservoir is disposed in fluid communication with the storage vessel. The reservoir may enable replenishment of the cryogenic material within the storage vessel that may be lost in form of the vapors.

In some embodiments, the storage vessel is axisymmetric. Thus, the storage vessel may allow accurate scanning of the at least one component (having thicker and thinner sections) as the storage vessel is rotated about the axis of rotation.

In some embodiments, the system further includes an outer vessel receiving the storage vessel therein.

In some embodiments, the at least one component is a turbine blade of a gas turbine engine.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 4 is a flow chart illustrating a method for scanning the at least one component;

DETAILED DESCRIPTION

Aspects and embodiments of the present disclosure will now be discussed with reference to the accompanying figures. Further aspects and embodiments will be apparent to those skilled in the art.

Figure 1:
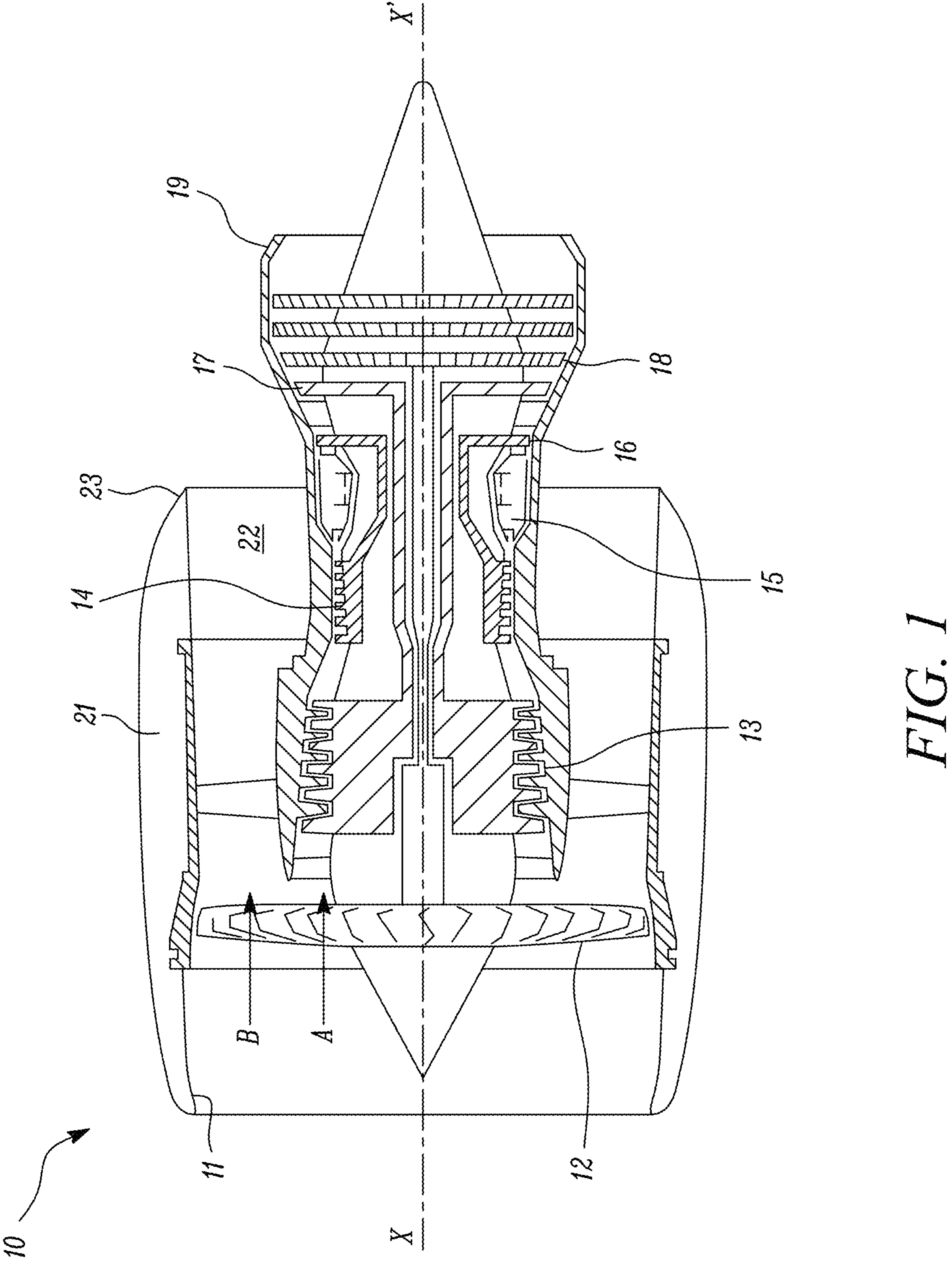
FIG. 1 is a schematic sectional side view of a gas turbine engine.

FIG. 1 shows a schematic sectional side view of a gas turbine engine 10 having a principal and rotational axis X-X'. The gas turbine engine 10 includes, in axial flow series, an air intake 11, a compressive fan 12 (which may also be referred to as a low-pressure compressor), an intermediate pressure compressor 13, a high-pressure compressor 14, a combustion equipment 15, a high-pressure turbine 16, an intermediate pressure turbine 17, a low-pressure turbine 18, and a core exhaust nozzle 19. A nacelle 21 generally surrounds the gas turbine engine 10 and defines the air intake 11, a bypass duct 22, and a bypass exhaust nozzle 23.

The gas turbine engine 10 works in a conventional manner so that the air entering the air intake 11 is accelerated by the compressive fan 12 to produce two air flows: a first air flow A into the intermediate pressure compressor 13 and a second air flow B which passes through the bypass duct 22 to provide a propulsive thrust. The intermediate pressure compressor 13 compresses the first air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resulting hot combustion products then expand through, and thereby drive the high, intermediate, and low-pressure turbines 16, 17, 18 before being exhausted through the core exhaust nozzle 19 to provide additional propulsive thrust. The high, intermediate, and low-pressure turbines 16, 17, 18 respectively drive the high and intermediate pressure compressors, 14, 13, and the compressive fan 12 by suitable interconnecting shafts.

In some embodiments, the gas turbine engine 10 is used in an aircraft. In some embodiments, the gas turbine engine 10 is an ultra-high bypass ratio engine (UHBPR). In addition, the present invention is equally applicable to aero gas turbine engines, marine gas turbine engines and land-based gas turbine engines.

Figure 2:
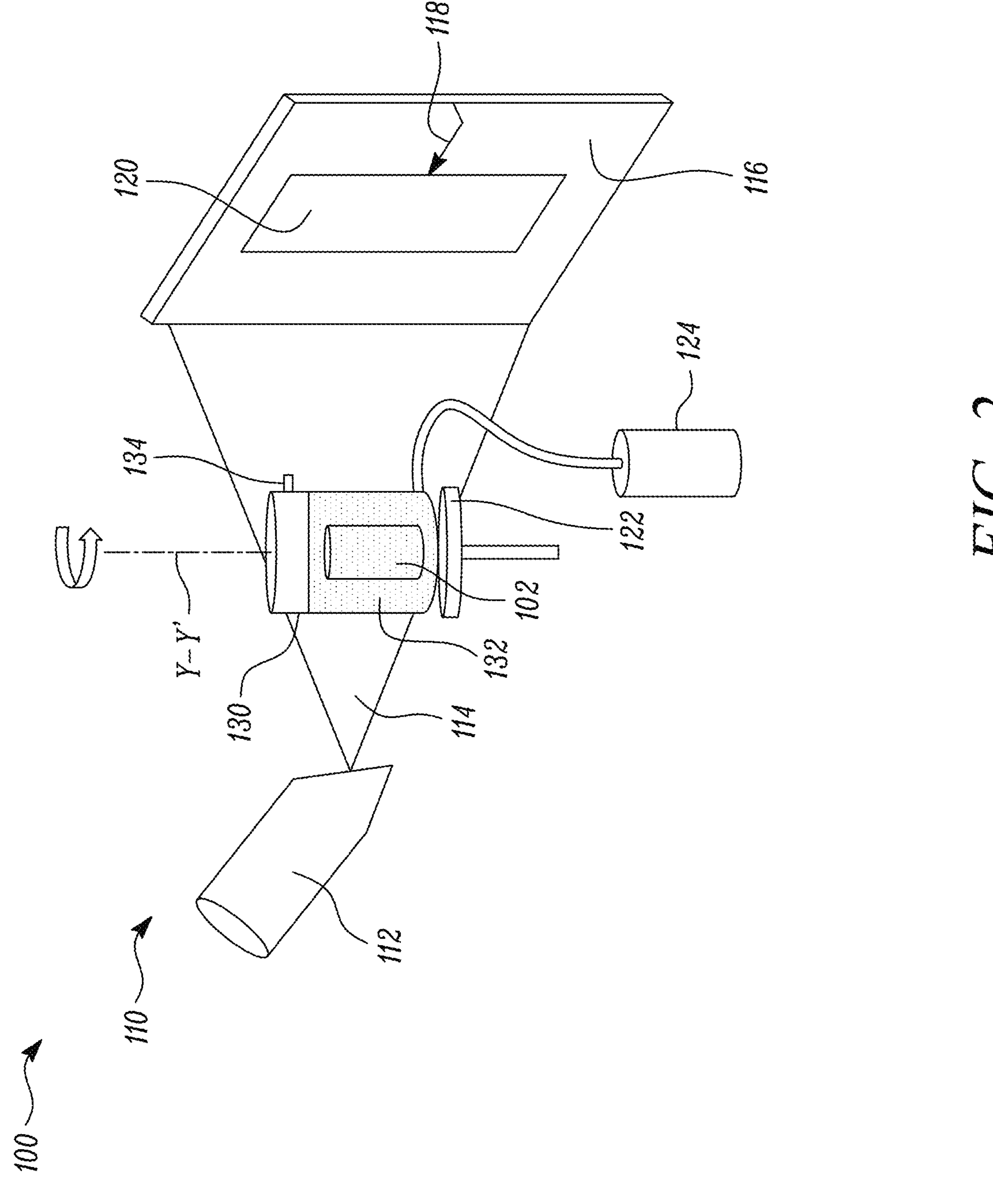
FIG. 2 is a schematic view of a system for scanning at least one component.

FIG. 2 is a schematic view of a system 100 for scanning at least one component 102. In some embodiments, the at least one component 102 is a part of the gas turbine engine 10 (shown in FIG. 1). In some embodiments, the at least one component 102 is a turbine blade of the gas turbine engine 10. The turbine blade may be a part of the high, intermediate, and low-pressure turbines 16, 17, 18 (shown in FIG. 1). However, it should be understood that the at least one component 102 may be any part/component of the gas turbine engine 10. The at least one component 102 is shown schematically in FIG. 1 for the purpose of illustration. Other shapes for the at least one component 102 are foreseeable and could be used.

In the illustrated embodiment of FIG. 2, only one component 102 is shown. However, the at least one component 102 may include multiple components to be scanned together. In some embodiments, the at least one component 102 may be supported by a support structure (not shown) within the storage vessel 130. The term "at least one component 102" is interchangeably referred to hereinafter as "the component 102".

The system 100 includes a computed tomography (CT) scanner 110. In some embodiments, the CT scanner 110 may allow the at least one component 102 to be scanned and a density of materials contained therein to be determined for various diagnostic and evaluation purposes. In general, CT scanning generates a three-dimensional (3D) image of a test specimen by utilizing digital geometry processing of a series of two-dimensional (2D) x-ray images taken around a single axis of rotation.

The CT scanner 110 includes an x-ray source 112 configured to generate an x-ray cone beam 114. In some embodiments, the x-ray cone beam 114 may represent an energy beam within the x-ray region of the electromagnetic spectrum. In some embodiments, the x-ray source 112 may include, for example, an x-ray tube (not shown) that produces x-rays by accelerating electrons through an electric field. The x-ray tube typically includes an electron source (or cathode) for generating electrons, and an x-ray target (or anode) containing x-ray emissive material adapted to emit the x-rays in response to incident electrons that have been accelerated by an accelerating electric field.

In some embodiments, the electric field may be established by means of a voltage provided to the x-ray source 112 by a high voltage power supply (not shown). The emitted x-rays may be further processed to produce the x-ray cone beam 114. The CT scanner 110 further includes a detector 116 configured to receive the x-ray cone beam 114 and generate an x-ray signal 118 in response to the reception of the x-ray cone beam 114. In some embodiments, the detector 116 may be an energy differentiating detector.

The system 100 further includes a storage vessel 130 disposed between the x-ray source 112 and the detector 116. The storage vessel 130 receives a cryogenic material 132 therein. The cryogenic material 132 is indicated by a dotted region in FIG. 2. In some embodiments, the storage vessel 130 may be a specialized vessel capable of handling the cryogenic material 132. The at least one component 102 is at least partially submerged within the cryogenic material 132, such that the at least one component 102 is cooled by the cryogenic material 132. In the illustrated embodiment of FIG. 2, the at least one component 102 is completely submerged within the cryogenic material 132.

The x-ray cone beam 114 passes through the storage vessel 130 while the at least one component 102 is disposed within the storage vessel 130. In some embodiments, the cryogenic material 132 may allow a temperature of the component 104 to be reduced during scanning of the at least one component 102. The x-ray source 112 generates the x-ray cone beam 114 after the at least one component 102 is cooled by the cryogenic material 132.

In the illustrated embodiment of FIG. 2, the x-ray source 112 projects the x-ray cone beam 114 towards the storage vessel 130 that includes the at least one component 102 surrounded by the cryogenic material 132. In some embodiments, the x-ray cone beam 114 may include a cone of radiation that covers a substantial section of the storage vessel 130. For example, the x-ray source 112 may irradiate the storage vessel 130 over a solid angle and the detector 116 may receive the transmitted radiation.

In some embodiments, the storage vessel 130 may have walls with low x-ray attenuation to enable the x-ray cone beam 114 to enter the storage vessel 130 and pass through the at least one component 102 while storing the cryogenic material 132. In some embodiments, the storage vessel 130 may have a capacity of 1 litre. Such a storage vessel 130 may be large enough to store the at least one component 102, such as the turbine blade of a small and medium size.

In some embodiments, the CT scanner 110 further includes a rotary table 122. The storage vessel 130 is mounted on the rotary table 122. The rotary table 122 allows rotation of the storage vessel 130 about an axis of rotation Y-Y'. Alternatively, the rotary table 122 may be fixed, and the x-ray cone beam 114 and the detector 116 may rotate around the axis of rotation Y-Y'.

In some embodiments, the cryogenic material 132 may also have low x-ray attenuation to allow the x-ray cone beam 114 to pass through the at least one component 102. In some embodiments, the cryogenic material 132 may be in a liquid state. In some embodiments, the cryogenic material 132 is liquid nitrogen. Liquid nitrogen is among the least expensive of commercially available cryogenic materials, and also among the most user friendly. Liquid nitrogen may therefore be handled and employed with minimal risk of damage to equipment and injury to personnel. However, it should be understood that any other suitable cryogenic material may be utilized, such as liquid air, hydrogen, helium, hydrocarbon materials.

In some other embodiments, the cryogenic material 132 may be in a solid state, e.g., dry ice. In such cases, the cryogenic material 132 may be in the form of small particles, powder, grains, or aggregates. For example, the cryogenic material 132 may be cooled to cryogenic temperatures and crushed before filling into the storage vessel 130. This may be referred to as indirect cooling. The crushed cryogenic material 132 may completely surround the at least one component 102 and may completely fill any voids or gaps within the storage vessel 130, thereby providing an approximately constant material thickness for the x-ray cone beam 114 to pass through and improving a scan quality of the at least one component 102. Further, in such cases, the storage vessel 130 having thinner walls may be used since a pressure within the storage vessel 130 is reduced.

In some embodiments, the cryogenic material 132 (e.g., a powder or granular material) may support the at least one component 102 within the storage vessel 130 in any orientation. In some embodiments, the cryogenic material 132 may have substantially the same x-ray beam attenuation as that of the at least one component 102. A constant attenuation coefficient throughout a volume of the storage vessel 130 may improve the scan quality of the at least one component 102 at varying angles.

In some embodiments, the at least one component 102 may be wrapped or coated in one or more films, sleeves, or walls, e.g., a polymer film, a polymer membrane, or a polymer bag to provide a boundary between the at least one component 102 and the cryogenic material 132, thereby preventing contamination of the at least one component 102.

In some embodiments, the storage vessel 130 further includes a vent 134 for vapors of the cryogenic material 132. In some embodiments, the vent 134 may allow the vapors of the cryogenic material 132 to escape the storage vessel 130, thereby preventing any negative effect on the scanning of the at least one component 102. In some embodiments, the system 100 further includes a reservoir 124 for storing the cryogenic material 132. In some embodiments, the reservoir 124 is disposed in fluid communication with the storage vessel 130. The reservoir 124 may allow the cryogenic material 132 to be replenished as required. In some embodiments, the system 100 may further include a pump (not shown) for pressurizing the cryogenic material 132 and delivering the cryogenic material 132 from the reservoir 124 to the storage vessel 130.

Figure 3:
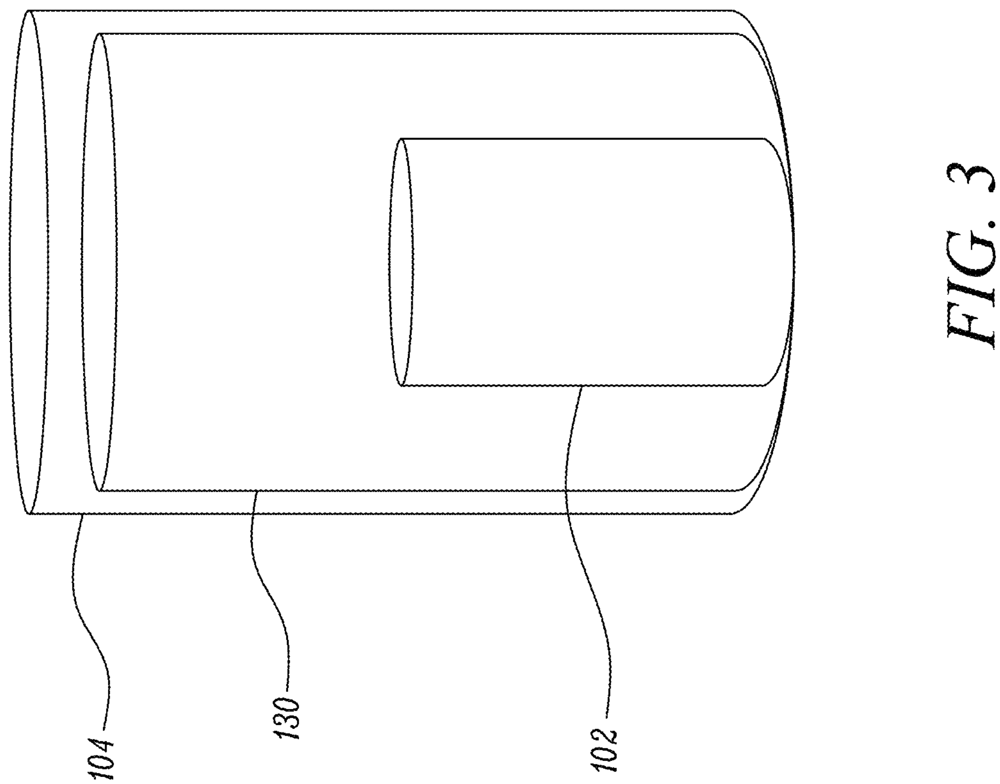
FIG. 3 is a schematic view of an outer vessel, a storage vessel, and the at least one component.

FIG. 3 is a schematic view of an outer vessel 104, the storage vessel 130, and the at least one component 102. In some embodiments, the system 100 (shown in FIG. 2) further includes the outer vessel 104 receiving the storage vessel 130 therein. In some embodiments, the storage vessel 130 may be placed within the outer vessel 104 before scanning the at least one component 102. In some embodiments, the outer vessel 104, along with the storage vessel 130 and the at least one component 102, may be placed between the x-ray source 112 (shown in FIG. 2) and the detector 116 (shown in FIG. 2) for scanning the at least one component 102. In some embodiments, the outer vessel 104 may be similar to the storage vessel 130. In some embodiments, the outer vessel 104 may be thin walled and have low x-ray attenuation.

In some embodiments, the outer vessel 104 may provide additional protection in case of leakage of the cryogenic material 132 (shown in FIG. 2) from the storage vessel 130. It should be noted that the outer vessel 104 may include multiple outer vessels 104 disposed within each other to form a multi-vessel assembly.

Referring again to FIG. 2, in some embodiments, the detector 116 receives the x-ray cone beam 114 that is attenuated after passing through the storage vessel 130 and the at least one component 102. In some embodiments, the detector 116 generates an electrical signal (i.e., the x-ray signal 118) representing an intensity of the impinging x-ray cone beam 114, and hence, the attenuated x-ray cone beam 114. Output from the detector 116 may then be reconstructed and processed in a manner known per se to produce a two-dimensional (2D) image in the form of a slice taken through the at least one component 102. Thus, the detector 116 generates an x-ray image 120 (scan view or slice) of the at least one component 102 based on the x-ray signal 118.

By adjusting relative positions of the at least one component 102 and the x-ray cone beam 114 and repeating the process, a plurality of 2D images of the at least one component 102 may be taken at different angular positions about the axis of rotation Y-Y'. In other words, the storage vessel 130 may be rotated about the axis of rotation Y-Y' to generate multiple scan views corresponding to multiple orientations of the storage vessel 130. Each scan view may portray an image of a 2D cross-section of the at least one component 102 and may directly correspond to a density of the material within each x-ray image 120.

In some embodiments, the scan views may be spaced apart at any distance that may provide a desired level of inspection, for example, a fraction of a millimetre or more. These scan views may be combined through a process called reconstruction to produce a 3D volumetric representation of the at least one component 102. In some embodiments, the storage vessel 130 is axisymmetric. This may allow accurate scanning of the at least one component 102 (having thicker and thinner sections) as the storage vessel 130 is rotated about the axis of rotation Y-Y'.

In some embodiments, the at least one component 102 may be disposed within the storage vessel 130 offset from the axis of rotation Y-Y'. This may improve the scan quality of the at least one component 102 in cases where the at least one component 102 is non-axisymmetric (e.g., the turbine blade). Improvement in the scan quality may be attributed to reduced beam artifacts and higher contrast.

In some embodiments, the at least one component 102 may include a plurality of components 102 disposed within the storage vessel 130. In some embodiments, the plurality of components 102 may be identical to each other. Further, the plurality of components 102 may be oriented to provide rotational symmetry about the axis of rotation Y-Y'. For example, the plurality of components 102 may be positioned along vertices of a regular geometric figure. Alternatively, the plurality of components 102 may have different shapes or sizes, and still possess a rotational symmetry about the axis of rotation Y-Y' in terms of positioning.

In some embodiments, the system 100 may further include a complimentary structure (not shown) disposed within the storage vessel adjacent to the at least one component 102. The complimentary structure may be disposed in a fixed relationship with the at least one component 102. In some embodiments, the complementary structure may be directly supported by the storage vessel 130 or held within a jig.

A volume of the complimentary structure is solid or filled with a filling material. In some embodiments, the complimentary structure may be configured to reduce a variation in imaging beam attenuation across the complementary structure and the at least one component 102 at multiple relative angles of rotation. Thus, the complimentary structure may improve the scan quality of the at least one component 102, especially where the at least one component 102 includes complex cross sections and/or cross-sections that change along their length.

In some alternative embodiments, the cryogenic material 132 may be removed from the storage vessel 130 after cooling the at least one component 102 and before scanning the at least one component 102. This may allow the pressure within the storage vessel 130 to be reduced in the absence of the cryogenic material 132. Thus, the storage vessel 130 with relatively thin walls may be used in such cases for scanning the at least one component 102. The support structure within the storage vessel 130 may provide a thermal mass for regulating the temperature of the at least one component 102.

It should be noted that other alternative energy forms, such as gamma rays, or any other energy beam suitable for scanning may also be used instead of x-rays for scanning the at least one component 102.

Figure 5C:
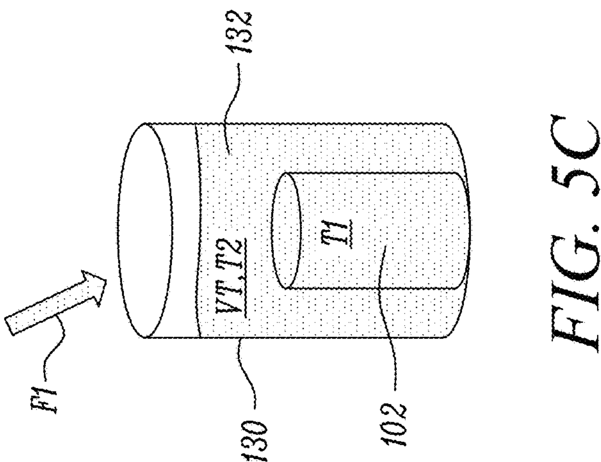
FIG. 5C is a schematic view of the at least one component submerged in a cryogenic material within the storage vessel.

FIG. 4 is a flow chart illustrating a method 200 for scanning the at least one component 102 (shown in FIG. 2). The method 200 will be described hereinafter with reference to the system 100 of FIG. 2, the outer vessel 104 of FIG. 3, and FIGS. 5A-10C. FIG. 5A is a schematic view of the storage vessel 130. Referring to FIGS. 2, 4-5A, at step 202, the method 200 includes providing the storage vessel 130. The storage vessel 130 is configured to store the cryogenic material 132 and the at least one component 102. In some embodiments, the storage vessel 130 may be a specialized vessel capable of storing the cryogenic material 132 and large enough to store the at least one component 102.

Figure 5B:
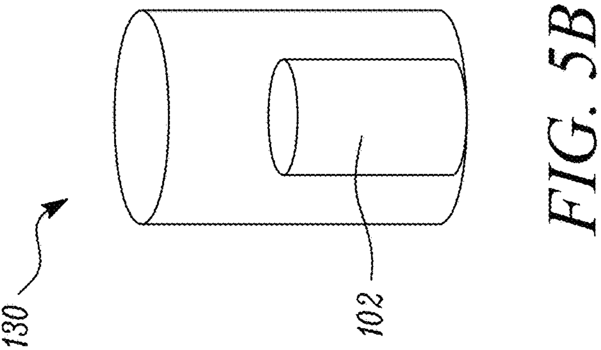
FIG. 5B is a schematic view of the at least one component placed inside the storage vessel.
Figure 5A:
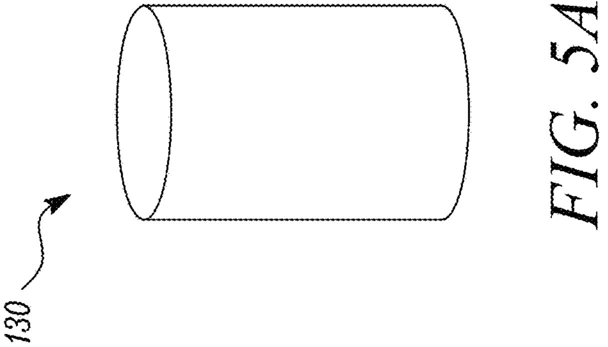
FIG. 5A is a schematic view of the storage vessel.

FIG. 5B is a schematic view of the storage vessel 130 and the at least one component 102. Referring to FIGS. 2, 4, and 5B, at step 204, the method 200 further includes placing the at least one component 102 inside the storage vessel 130. In some embodiments, the at least one component 102 is the turbine blade of the gas turbine engine 10 (shown in FIG. 1). FIG. 5C is a schematic view of the storage vessel 130 enclosing the at least one component 102 and the cryogenic material 132. Referring to FIGS. 2, 4, and 5C, at step 206, the method 200 further includes filling the storage vessel 130 with the cryogenic material 132 up to a total predetermined volume VT, such that the at least one component 102 is at least partially submerged in the cryogenic material 132. In some embodiments, the cryogenic material 132 is liquid nitrogen.

At step 208, the method 200 further includes cooling, via the cryogenic material 132, the at least one component 102. In some embodiments, cooling the at least one component 102 includes keeping the storage vessel 130 until a temperature T1 of the at least one component 102 is equal to a temperature T2 of the cryogenic material 132 prior to generating the x-ray cone beam 114.

In some embodiments, filling the storage vessel 130 further includes regulating a flow F1 of the cryogenic material 132 into the storage vessel 130. For example, the flow F1 of the cryogenic material 132 per unit time may be regulated to allow a controlled decrease in the temperature of the storage vessel 130 and the at least one component 102. In some embodiments, the flow F1 of the cryogenic material 132 may be regulated based on an acceptable rate of decrease in the temperature of the storage vessel 130 and the at least one component 102. A valve (not shown) may be used for regulating the flow F1 of the cryogenic material 132.

In some embodiments, filling the storage vessel 130 includes progressively increasing a volume of the cryogenic material 132 inside the storage vessel 130 in a plurality of stages S1-Sm (collectively, stages S) separated from each other by corresponding predetermined time durations P1-Pn (collectively, predetermined time durations P), where m is a positive integer corresponding to a total number of the stages S and n is a positive integer corresponding to a total number of the predetermined time durations P. FIGS. 6A-6D show the respective stages S1-S4. However, it should be understood that the plurality of stages S may include any number of the stages S.

Figures 6A, 6B, 6C, 6D:
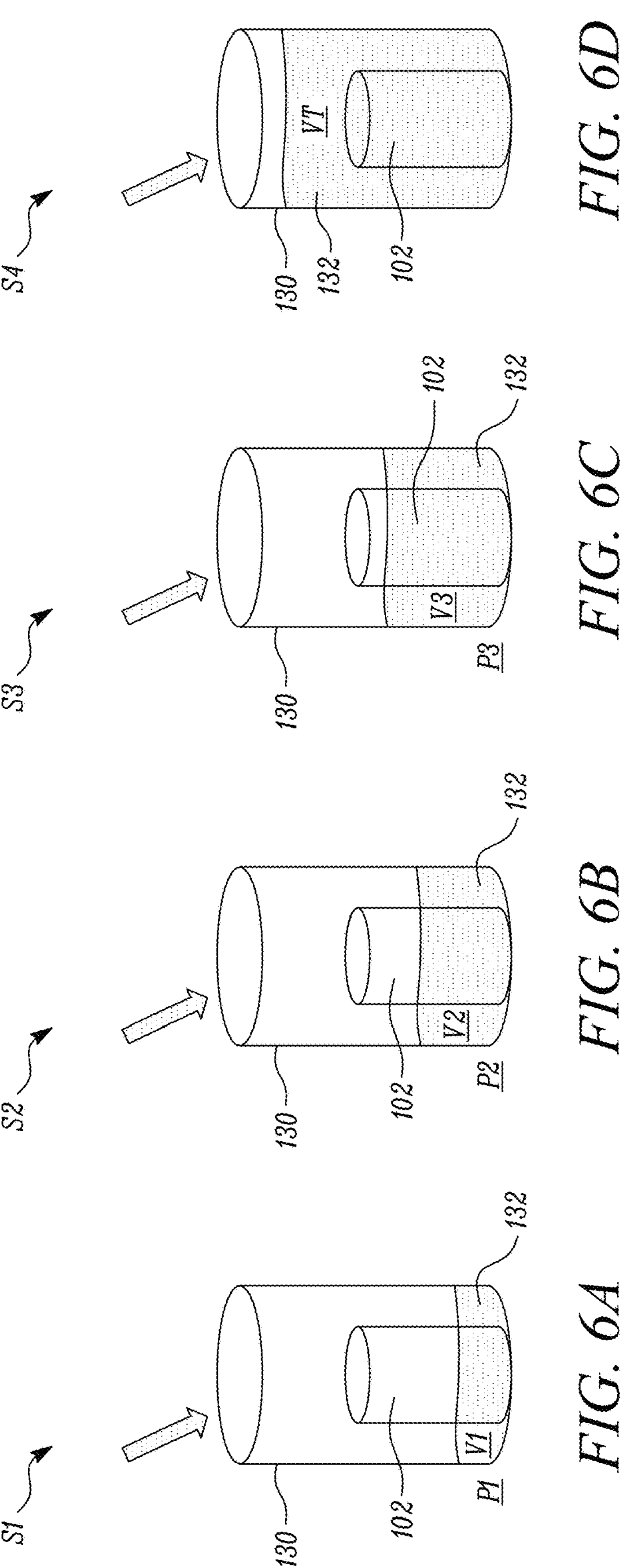
FIGS. 6A-6C are schematic views of the storage vessel enclosing the at least one component and different volumes of the cryogenic material.
FIG. 6D is a schematic view of the storage vessel enclosing the at least one component and a total predetermined volume of the cryogenic material.

FIG. 6A is a schematic view of the storage vessel 130 enclosing the at least one component 102 and a volume V1 of the cryogenic material 132 at the stage S1. In some embodiments, at the stage S1, the storage vessel 130 is first filled with the cryogenic material 132 up to the volume V1. Subsequently, the storage vessel 130 is kept for the predetermined time duration P1. Keeping the storage vessel 130 includes keeping the storage vessel 130 stationary without filling any additional volume of the cryogenic material 132, such that the at least one component 102 may remain in contact with the existing volume of the cryogenic material 132 for a desired time duration.

FIG. 6B is a schematic view of the storage vessel 130 enclosing the at least one component 102 and a volume V2 of the cryogenic material 132 at the stage S2. At the stage S2, the storage vessel 130 is then filled with the cryogenic material 132 up to the volume V2. Subsequently, the storage vessel 130 is kept for the predetermined time duration P2. FIG. 6C is a schematic view of the storage vessel 130 enclosing the at least one component 102 and a volume V3 of the cryogenic material 132 at the stage S3. At the stage S3, the storage vessel 130 is then filled with the cryogenic material 132 up to the volume V3. Subsequently, the storage vessel 130 is kept for the predetermined time duration P3. FIG. 6D is a schematic view of the storage vessel 130 enclosing the at least one component 102 and the total predetermined volume VT of the cryogenic material 132 at the stage S4. At the stage S4, the storage vessel 130 is then filled with the cryogenic material 132 up to the total predetermined volume VT.

In the illustrated embodiments of FIGS. 6A-6D, the volume V2 may be twice the volume V1, the volume V3 may be thrice the volume V1, and the total predetermined volume VT may be four times the volume V1. Further, the predetermined time duration P1-P3 may be similar to each other. However, the volumes V1, V2, V3, VT may assume different values based on application requirements and the predetermined time duration P1-P3 may assume different values based on application requirements. In some embodiments, progressively increasing the volume of the cryogenic material 132 inside the storage vessel 130 in the plurality of stages S may reduce a risk of thermal shock to the at least one component 102 and the storage vessel 130 by eliminating sudden reduction in their temperatures in the presence of the cryogenic material 132.

Figure 7C:
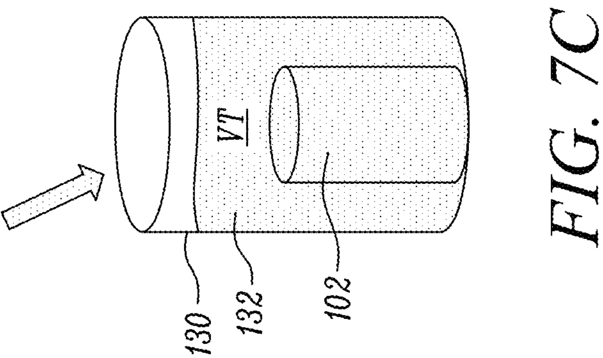
FIG. 7C is a schematic view of the storage vessel enclosing the at least one component and the total predetermined volume of the cryogenic material.
Figure 7B:
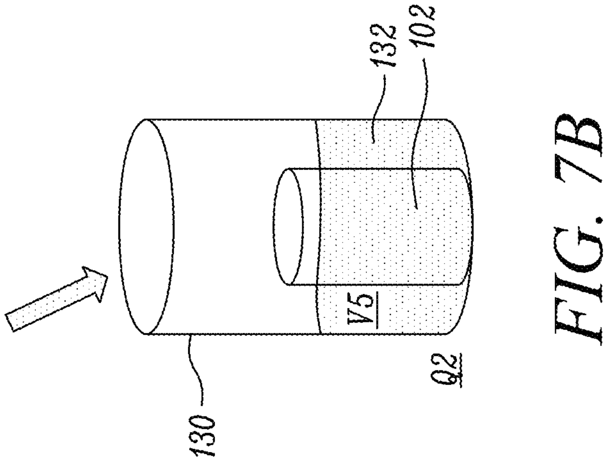
FIG. 7B is a schematic view of the storage vessel enclosing the at least one component and a second predetermined threshold volume of the cryogenic material.
Figure 7A:
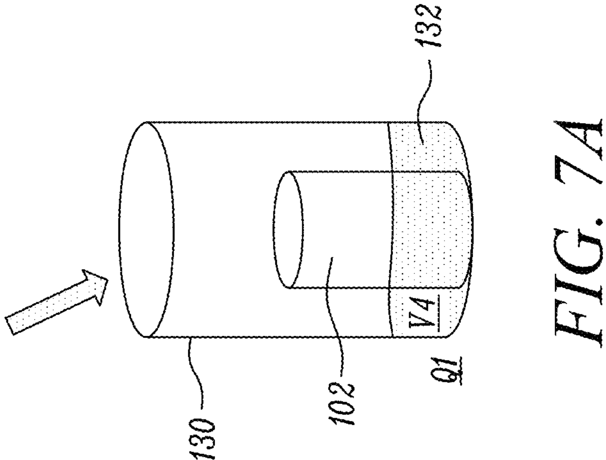
FIG. 7A is a schematic view of the storage vessel enclosing the at least one component and a first predetermined threshold volume of the cryogenic material.

The storage vessel 130 may also be filled with the cryogenic material 132 by using alternative methods. FIGS. 7A-7C describe an alternative method for filling the storage vessel 130 with the cryogenic material 132. FIG. 7A is a schematic view of the storage vessel 130 enclosing the at least one component 102 and a first predetermined threshold volume V4 of the cryogenic material 132. Referring to FIGS. 2, 4, and 7A, in some embodiments, filling the storage vessel 130 includes the step of filling the storage vessel 130 with the cryogenic material 132 up to the first predetermined threshold volume V4. For example, the first predetermined threshold volume V4 is about 10% of the total predetermined volume VT (shown in FIG. 5C). In some embodiments, filling the storage vessel 130 further includes the step of keeping the storage vessel 130 for a first predetermined period of time Q1 with the first predetermined threshold volume V4 of the cryogenic material 132. For example, the first predetermined period of time Q1 is about 2 hours.

FIG. 7B is a schematic view of the storage vessel 130 enclosing the at least one component 102 and a second predetermined threshold volume V5 of the cryogenic material 132. Referring to FIGS. 2, 4, and 7B, in some embodiments, filling the storage vessel 130 further includes the step of filling the storage vessel 130 with the cryogenic material 132 up to the second predetermined threshold volume V5. For example, the second predetermined threshold volume V5 is about 30% of the total predetermined volume VT (shown in FIG. 5C). In some embodiments, filling the storage vessel 130 further includes the step of keeping the storage vessel 130 for a second predetermined period of time Q2 with the second predetermined threshold volume V5 of the cryogenic material 132. For example, the second predetermined period of time Q2 is about 48 hours.

FIG. 7C is a schematic view of the storage vessel 130 enclosing the at least one component 102 and the total predetermined volume VT of the cryogenic material 132. Referring to FIGS. 2, 4, and 7C, in some embodiments, filling the storage vessel 130 further includes the step of filling the storage vessel 130 with the cryogenic material 132 up to the total predetermined volume VT. In some embodiments, the aforementioned steps may reduce the risk of thermal shock to the at least one component 102 and the storage vessel 130 by eliminating sudden reduction in their temperatures in the presence of the cryogenic material 132.

Figure 8:
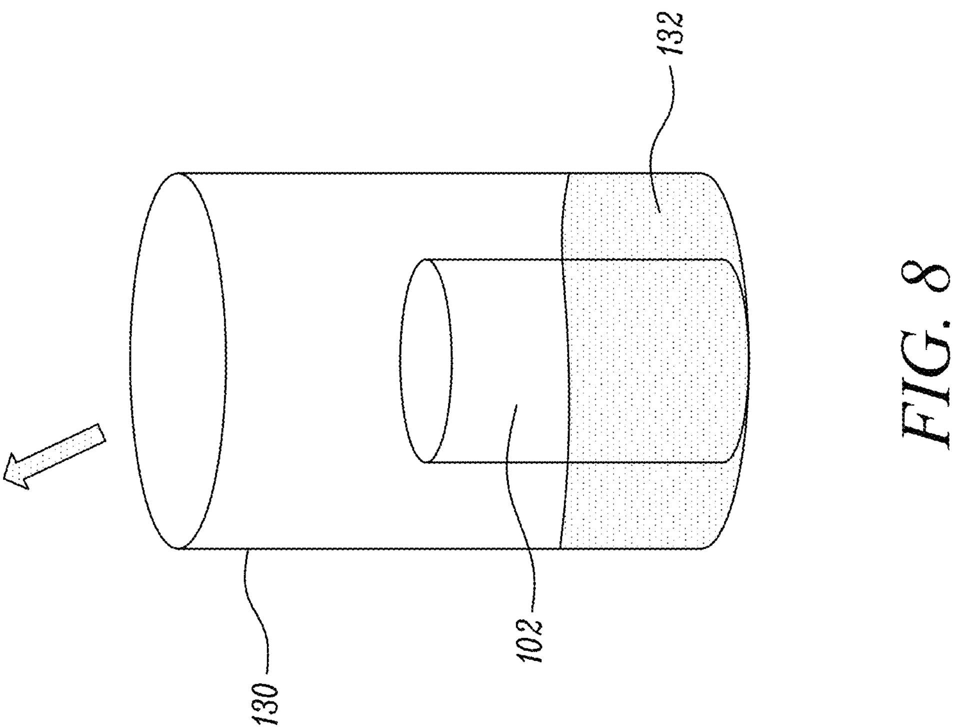
FIG. 8 is a schematic view of the storage vessel and the at least one component where the cryogenic material is removed from the storage vessel.

In some embodiments, the cryogenic material 132 may be removed from the storage vessel 130 after cooling the at least one component 102 and before scanning the at least one component 102. FIG. 8 is a schematic view of the storage vessel 130 and the at least one component 102 where the cryogenic material 132 is removed from the storage vessel 130. Referring to FIGS. 4 and 8, in some embodiments, the method 200 further includes removing the cryogenic material 132 from the storage vessel 130 prior to generating the x-ray cone beam 114 (shown in FIG. 2). This may allow a pressure within of the storage vessel 130 to be reduced in the absence of the cryogenic material 132. Thus, the storage vessel 130 with relatively thin walls may be used in such cases for scanning the at least one component 102.

Referring to FIGS. 3-4, in some embodiments, the method 200 further includes receiving the storage vessel 130 within the outer vessel 104. In some embodiments, the storage vessel 130 may be placed within the outer vessel 104 before scanning the at least one component 102. In some embodiments, the outer vessel 104, along with the storage vessel 130 and the at least one component 102, may be placed between the x-ray source 112 (shown in FIG. 2) and the detector 116 (shown in FIG. 2) for scanning the at least one component 102.

Referring to FIGS. 2 and 4, at step 210, the method 200 further includes providing the CT scanner 110. The CT scanner 110 includes the x-ray source 112 and the detector 116. At step 212, the method 200 further includes placing the storage vessel 130 (including the at least one component 102 and the cryogenic material 132) between the x-ray source 112 and the detector 116. At step 214, the method 200 further includes generating, via the x-ray source 112, the x-ray cone beam 114 after cooling of the at least one component 102.

The x-ray cone beam 114 passes through the storage vessel 130 while the at least one component 102 is disposed within the storage vessel 130. In some embodiments, the x-ray cone beam 114 passes through the storage vessel 130 while the at least one component 102 is being surrounded by the cryogenic material 132 within the storage vessel 130. At step 216, the method 200 further includes receiving the x-ray cone beam 114 at the detector 116. The detector 116 is configured to generate the x-ray signal 118 in response to receiving the x-ray cone beam 114. At step 218, the method 200 further includes generating the x-ray image 120 of the at least one component 102 based on the x-ray signal 118.

Alternatively, the storage vessel 130 without the cryogenic material 132 may also be placed between the x-ray source 112 and the detector 116 after cooling the at least one component 102. In such a case, the x-ray cone beam 114 passes through the storage vessel 130 while the at least one component 102 is not surrounded by the cryogenic material 132.

Figure 9:
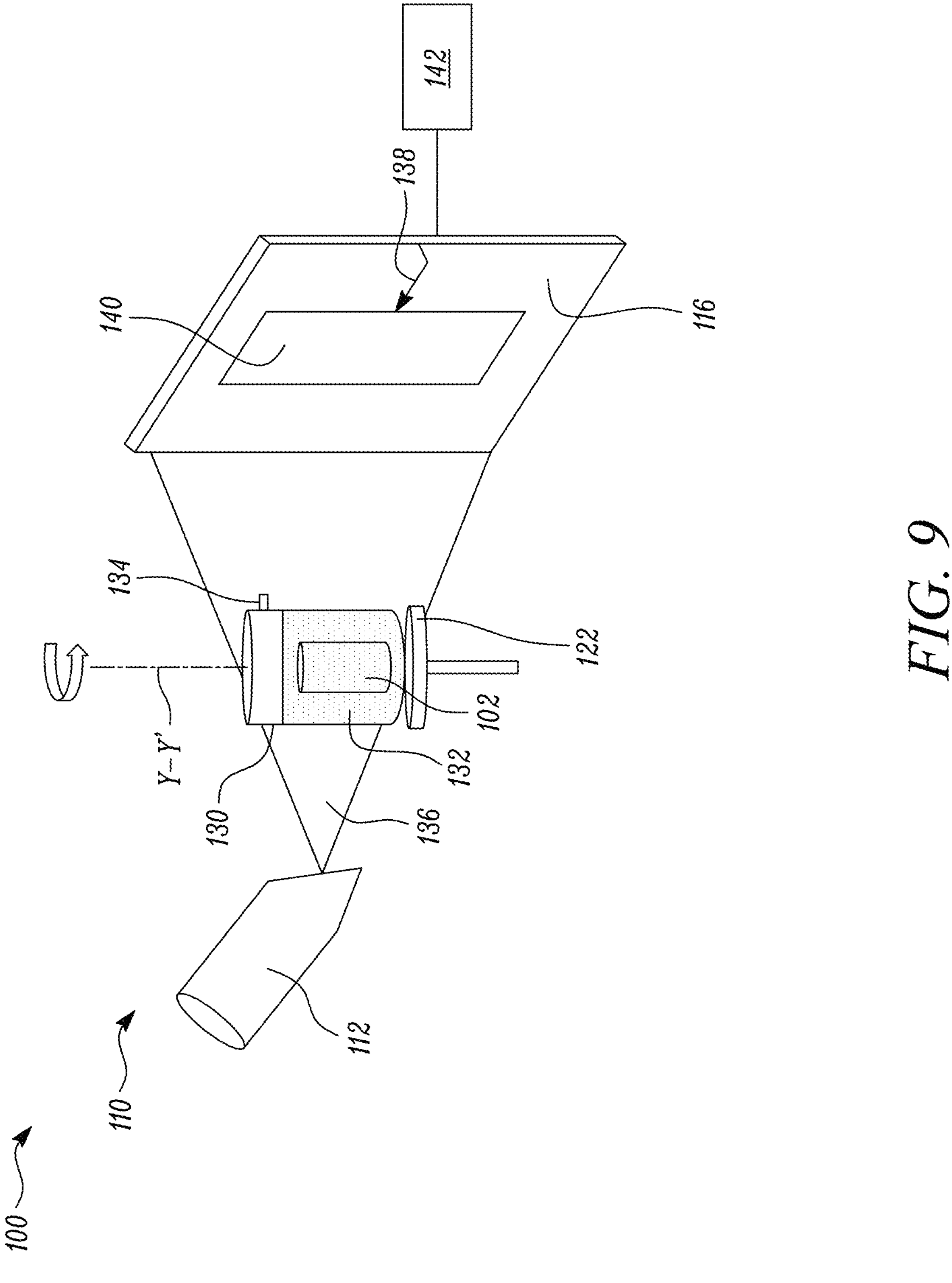
FIG. 9 is a schematic view of the system for scanning the at least one component.

FIG. 9 is a schematic view of the system 100, according to another embodiment of the present disclosure. Referring to FIGS. 2, 4, and 9, in some embodiments, the method 200 further includes rotating the storage vessel 130 about the axis of rotation Y-Y' after generating the x-ray image 120 (shown in FIG. 2). In some embodiments, the method 200 further includes generating, via the x-ray source 112, at least one additional x-ray cone beam 136 passing through the storage vessel 130 while the at least one component 102 is disposed within the storage vessel 130. In the illustrated embodiment of FIG. 9, the at least one additional x-ray cone beam 136 passes through the storage vessel 130 while the component 102 is being surrounded by the cryogenic material 132.

In some embodiments, the method 200 further includes receiving the at least one additional x-ray cone beam 136 at the detector 116. In some embodiments, the detector 116 is configured to generate at least one additional x-ray signal 138 in response to receiving the at least one additional x-ray cone beam 136. In some embodiments, the method 200 further includes generating at least one additional x-ray image 140 of the at least one component 102 based on the at least one additional x-ray signal 138.

Rotating the storage vessel 130 about the axis of rotation Y-Y' may allow the at least one additional x-ray image 140 to be taken at different positions about the axis of rotation Y-Y'. Thus, multiple x-ray images of the at least one component 102 may be taken at different orientations about the axis of rotation Y-Y'. In some embodiments, the method 200 further includes generating a 3D scan image 142 of the at least one component 102 based on the x-ray image 120 (shown in FIG. 2) and the at least one additional x-ray image 140.

As shown in FIG. 9, the storage vessel 130 includes the at least one component 102 submerged within the cryogenic material 130. However, the storage vessel 130 (along with the at least one component 102) may also be placed between the x-ray source 112 and the detector 116 without the cryogenic material 132 as discussed previously.

Figure 10C:
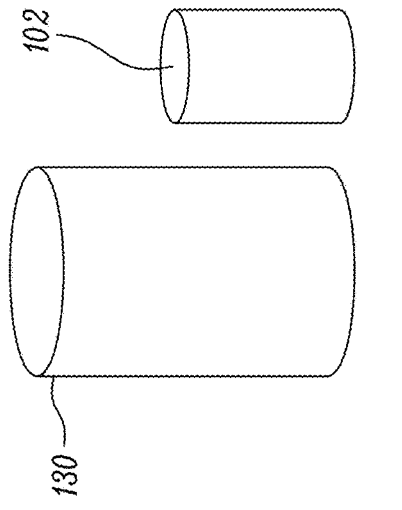
FIG. 10C is a schematic view of the storage vessel and the at least one component where the at least one component is removed from the storage vessel.
Figure 10B:
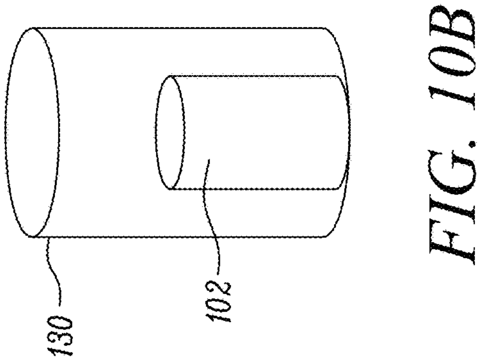
FIG. 10B is a schematic view of the storage vessel and the at least one component after removing the cryogenic material from the storage vessel.
Figure 10A:
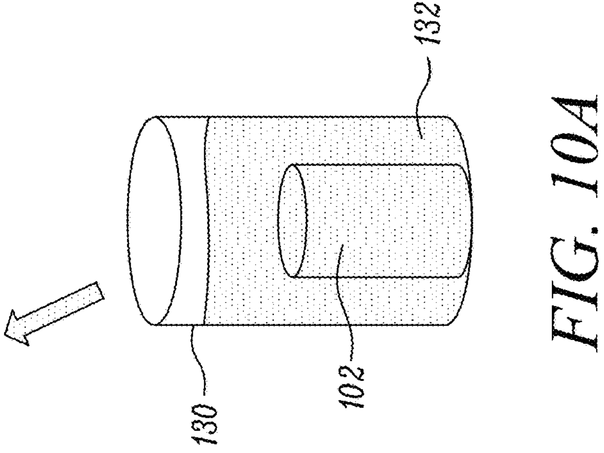
FIG. 10A is a schematic view of the storage vessel, the at least one component, and the cryogenic material after scanning the at least one component.

FIG. 10A is a schematic view of the storage vessel 130, the at least one component 102, and the cryogenic material 132 after scanning the at least one component 102. Referring to FIGS. 4 and 10A, in some embodiments, the method 200 further includes removing the storage vessel 130 from the CT scanner 110 (shown in FIG. 9). FIG. 10B is a schematic view of the storage vessel 130 and the at least one component 102 after removing the cryogenic material 132 (shown in FIG. 10A) from the storage vessel 130. Referring to FIGS. 4 and 10B, in some embodiments, the method 200 further includes removing the cryogenic material 132 (shown in FIG. 10A) from the storage vessel 130.

FIG. 10C is a schematic view of the storage vessel 130 and the at least one component 102 where the at least one component 102 is removed from the storage vessel 130. Referring to FIGS. 4 and 10C, in some embodiments, the method 200 further includes removing the at least one component 102 from the storage vessel 130 after the at least one component 102 attains a room temperature. Thus, the temperature of the at least one component 102 may increase to the room temperature before the at least one component 102 is removed from the storage vessel 130, thereby reducing any risk to nearby systems and personnel.

Referring to FIGS. 2-10C, the system 100 and the method 200 of the present disclosure includes placing the at least one component 102 inside the storage vessel 130 and filling the storage vessel 130 with the cryogenic material 132, such that the at least one component 102 is submerged in the cryogenic material 132. The cryogenic material 132 may reduce the temperature of the at least one component 102, thereby significantly reducing x-ray attenuation by absorption during scanning of the at least one component 102 using the CT scanner 110. Thus, the proposed system 100 and method 200 may improve the scan quality of the at least one component 102 even though the at least one component 102 may be thick and include high density materials.

Whilst it is envisaged that the system 100 and method 200 of the present invention will be suited for use with the 3D CT scanning technique described above, it is also possible to use the system 100 and method 200 with 2D CT scanning techniques. Further, it should be noted that the proposed system 100 and method 200 is equally applicable to other non-destructive diagnostic techniques that use x-rays for imaging purposes.

It should be noted that any scannable object and any shape of the scannable object may be used in the proposed method 200. For example, the object may be made of metal, composite, polymer, or a mixture of materials. The object may be cast, moulded, machined or 3D printed (additively manufactured), for example. The object may be a simple shape, such as a cylinder, a sphere, or a more complex object, such as a component for use in a machine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method for scanning at least one component, the method comprising the steps of:

providing a storage vessel, wherein the storage vessel is configured to store a cryogenic material and the at least one component;

placing the at least one component inside the storage vessel;

filling the storage vessel with the cryogenic material up to a total predetermined volume, such that the at least one component is at least partially submerged in the cryogenic material;

cooling, via the cryogenic material, the at least one component;

providing a computed tomography scanner, wherein the CT scanner comprises an x-ray source and a detector;

placing the storage vessel between the x-ray source and the detector;

generating, via the x-ray source, an x-ray cone beam after cooling of the at least one component, the x-ray cone beam passing through the storage vessel while the at least one component is disposed within the storage vessel;

receiving the x-ray cone beam at the detector, wherein the detector is configured to generate an x-ray signal in response to receiving the x-ray cone beam; and generating an x-ray image of the at least one component based on the x-ray signal, wherein filling the storage vessel comprises the steps of:

filling the storage vessel with the cryogenic material up to a first predetermined threshold volume;

keeping the storage vessel for a first predetermined period of time with the first predetermined threshold volume of the cryogenic material, the first predetermined period of time being substantially two hours;

filling the storage vessel with the cryogenic material up to a second predetermined threshold volume;

keeping the storage vessel for a second predetermined period of time with the second predetermined threshold volume of the cryogenic material; and filling the storage vessel with the cryogenic material up to the total predetermined volume.

2. The method of claim 1, further comprising removing the cryogenic material from the storage vessel prior to generating the x-ray cone beam.

3. The method of claim 1, wherein the x-ray cone beam passes through the storage vessel while the at least one component is being surrounded by the cryogenic material within the storage vessel.

4. The method of claim 3, further comprising:

removing the storage vessel from the CT scanner;

removing the cryogenic material from the storage vessel; and removing the at least one component from the storage vessel after the at least one component attains a room temperature.

5. The method of claim 1, wherein filling the storage vessel comprises progressively increasing a volume of the cryogenic material inside the storage vessel in a plurality of stages separated from each other by corresponding predetermined time durations.

6. The method of claim 1, wherein the second predetermined period of time is substantially 48 hours.

7. The method of claim 1, wherein filling the storage vessel further comprises regulating a flow of the cryogenic material into the storage vessel.

8. The method of claim 1, wherein cooling the at least one component comprises keeping the storage vessel until a temperature of the at least one component is equal to a temperature of the cryogenic material prior to generating the x-ray cone beam.

9. The method of claim 1, further comprising:

rotating the storage vessel about an axis of rotation after generating the x-ray image;

generating, via the x-ray source, at least one additional x-ray cone beam passing through the storage vessel while the at least one component is disposed within the storage vessel;

receiving the at least one additional x-ray cone beam at the detector, wherein the detector is configured to generate at least one additional x-ray signal in response to receiving the at least one additional x-ray cone beam; and generating at least one additional x-ray image of the at least one component based on the at least one additional x-ray signal.

10. The method of claim 9, further comprising generating a 3D scan image of the at least one component based on the x-ray image and the at least one additional x-ray image.

11. The method of claim 1, wherein the cryogenic material is liquid nitrogen.

12. The method of claim 1, wherein the at least one component is a turbine blade of a gas turbine engine.

13. The method of claim 1, further comprising receiving the storage vessel within an outer vessel.

14. A system for scanning at least one component, the system comprising:

a computed tomography scanner comprising an x-ray source configured to generate an x-ray cone beam, and a detector configured to receive the x-ray cone beam and generate an x-ray signal in response to the reception of the x-ray cone beam; and a storage vessel disposed between the x-ray source and the detector, the storage vessel receiving a cryogenic material therein, wherein the storage vessel is filled with the cryogenic material up to a total predetermined volume, such that the at least one component is at least partially submerged within the cryogenic material, and that the at least one component is cooled by the cryogenic material;

wherein:

the storage vessel is filled with the cryogenic material up to a first predetermined threshold volume, the storage vessel is kept for a first predetermined period of time with the first predetermined threshold volume of the cryogenic material, the first predetermined period of time being substantially two hours;

the storage vessel is filled with the cryogenic material up to a second predetermined threshold volume;

the storage vessel is kept for a second predetermined period of time with the second predetermined threshold volume of the cryogenic material; and the storage vessel is kept with the cryogenic material up to the total predetermined volume;

wherein the x-ray source generates the x-ray cone beam after the at least one component is cooled by the cryogenic material, and wherein the x-ray cone beam passes through the storage vessel while the at least one component is disposed within the storage vessel.

15. The system of claim 14, wherein the cryogenic material is liquid nitrogen.

16. The system of claim 14, wherein the storage vessel further comprises a vent for vapors of the cryogenic material.

17. The system of claim 14, further comprising a reservoir for storing the cryogenic material, wherein the reservoir is disposed in fluid communication with the storage vessel.

18. The system of claim 14, wherein the storage vessel is axisymmetric.

19. The system of claim 14, further comprising an outer vessel receiving the storage vessel therein.

20. The system of claim 14, wherein the at least one component is a turbine blade of a gas turbine engine.

* * * * *